(12) United States Patent
Palmieri

(10) Patent No.: US 6,523,688 B1
(45) Date of Patent: Feb. 25, 2003

(54) DEVICE FOR USE IN MEASURING, STORING, DISPENSING AND RECORDING CONSUMPTION OF LIQUID

(76) Inventor: Herman D. Palmieri, 1532 Eben St., Pittsburgh, PA (US) 15226

( * ) Notice: Subject to any disclaimer, the term of this patent is extended or adjusted under 35 U.S.C. 154(b) by 0 days.

(21) Appl. No.: 09/633,716

(22) Filed: Aug. 7, 2000

Related U.S. Application Data

(63) Continuation-in-part of application No. 09/504,133, filed on Feb. 15, 2000.

(51) Int. Cl.$^7$ .............................................. B65D 85/00
(52) U.S. Cl. ................. 206/459.1; 40/310; 116/201; 116/279; 116/307; 215/230; 215/365
(58) Field of Search .................. 206/459.1; 40/307, 40/310; 116/201, 279, 307, 316, 317, 334; 215/230, 365

(56) References Cited

U.S. PATENT DOCUMENTS

| | | | |
|---|---|---|---|
| 710,708 A | * 10/1902 | McShane ..................... 215/365 |
| 3,392,468 A | * 7/1968 | Wolf ......................... 206/459.1 |
| 3,974,916 A | * 8/1976 | Bartolucci ................ 206/459.1 |
| 4,722,451 A | * 2/1988 | Conrad ......................... 215/365 |
| 4,906,395 A | * 3/1990 | Stoesser et al. ........... 206/459.1 |
| 5,421,286 A | * 6/1995 | McLean ...................... 116/201 |
| 5,492,077 A | * 2/1996 | Rose ............................ 116/307 |
| 5,531,338 A | * 7/1996 | Sklar ............................ 215/365 |

FOREIGN PATENT DOCUMENTS

| GB | 017176 | * 8/1899 | .................. 215/365 |

* cited by examiner

Primary Examiner—Bryon P. Gehman
(74) Attorney, Agent, or Firm—Clifford A. Poff

(57) ABSTRACT

A vessel is constructed dispensing and displaying a measured quantity of water by a graduated scale along the side wall of the vessel. The consumption of each measured quantity of water is tallied by actuation of one of a plurality of tactile buttons. In one embodiment, the buttons are distributed about a side wall of the vessel and in a second embodiment, the buttons are distributed about an end wall in a cap attached to the vessel.

13 Claims, 5 Drawing Sheets

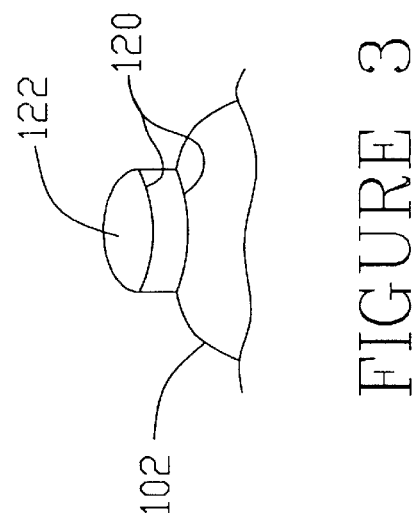
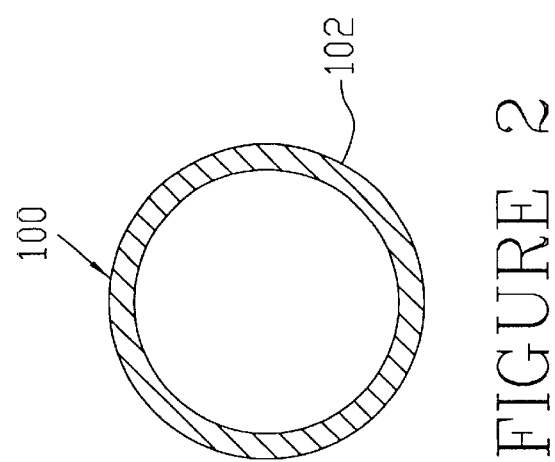
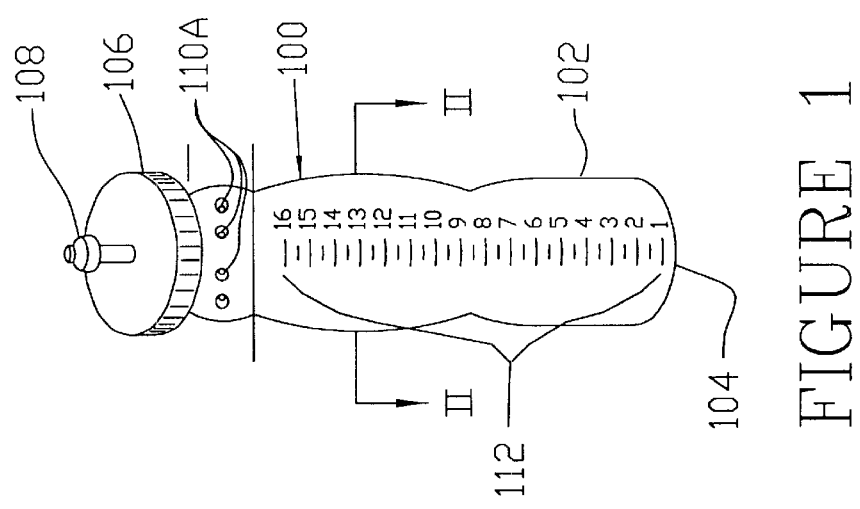

DEVICE FOR USE IN MEASURING, STORING, DISPENSING AND RECORDING CONSUMPTION OF LIQUID

CROSS REFERENCE TO RELATED APPLICATION

This application is a continuation in part of U.S. patent application Ser. No. 09/504,133, filed Feb. 15, 2000.

BACKGROUND OF THE INVENTION

1. Field of the Invention

The present invention relates to a vessel for measuring, storing, dispensing and recording the consumption of liquid and more particularly the inclusion of tactile buttons in the side wall of a water storage vessel for indicating a tally of the initial and repeated filling of water in the vessel.

2. Description of Related Art

Next to air, water is the element most necessary for human survival. In the past, it had been widely accepted and usually recommended for an adult individual to consume eight cups (64 oz) of water per day. However, this one size fits all standard is rapidly being replaced with a common sense approach to daily water intake. A suggested formula for a daily water intake after evaluating of users physical condition is ½ ounce per pound of body weight when an individual is inactive and ⅔ ounce per pound when an individual is engages in athletic activity. It has been suggested that before exercise an amount of water be ingested. The water intake should be at regular intervals throughout waking hours. A need therefore exists for a device to enable an individual to tally the consumption of water in measurable amounts throughout a given period, e.g., 24 hr. period.

It is an object of the present invention to provide a vessel enabling storing the measurement of liquids along with a resettable indicator to tally the number of refills of the vessel and therefore consumption of liquid over a designated period.

SUMMARY OF THE INVENTION

According to the present invention there is provided a device for use in dispensing, measuring and recording consumption of a liquid, the device comprising in combination of a vessel having a boundary wall enclosing a volume for storing a liquid, the boundary wall terminates to form an aperture to supply and discharge liquid to the vessel, and a plurality of tactile buttons supported by the vessel and having bidirectional positions to indicate a tally of repeated filling of liquid in the vessel.

BRIEF DESCRIPTION OF THE SEVERAL VIEWS OF THE DRAWINGS

These features and advantages as well as others will be more fully understood when the following description is read in light of the accompanied drawings of which:

FIG. 1 is a perspective of elevation of one embodiment of the device according to the present invention;

FIG. 2 is a sectional view taken along lines II—II of FIG. 1;

FIGS. 3 and 4 are enlarged fragmentary views of a tactile button used to tally repeated fillings of liquid in the device;

DETAILED DESCRIPTION OF THE INVENTION

Figure 4:
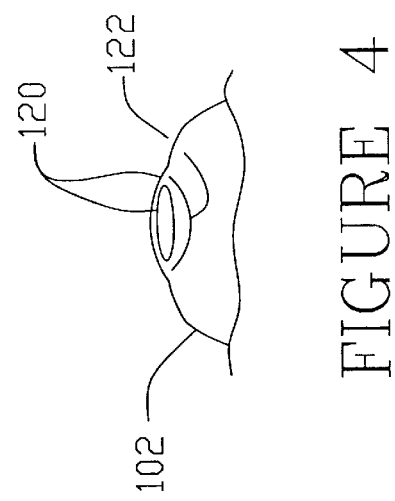
Figure 4A:
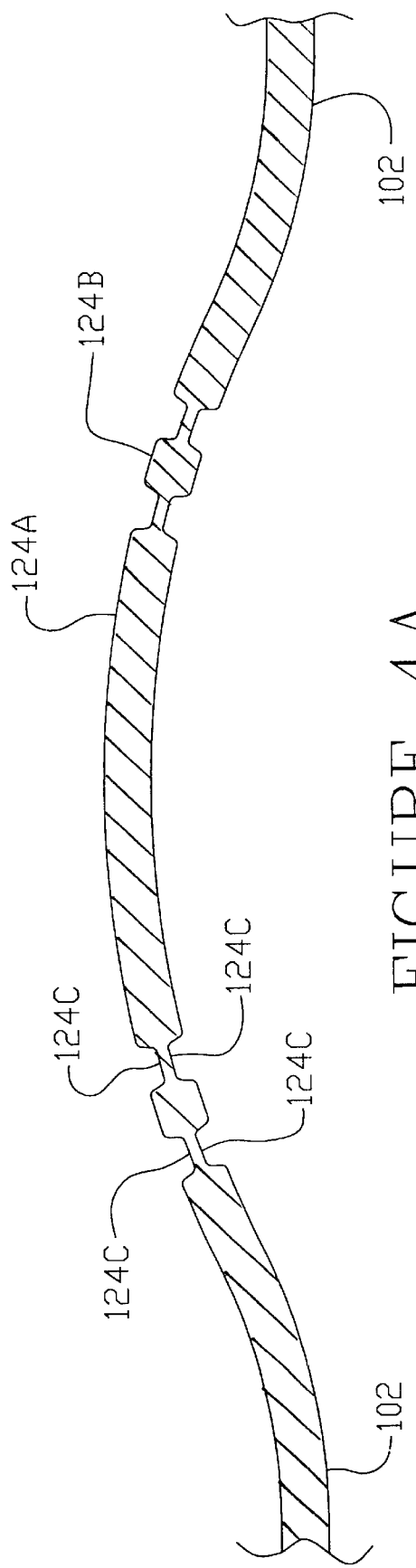
FIG. 4A is an enlarged sectional view of the side wall construction of a tactile button shown in FIGS. 3 and 4.

In the embodiment of the invention shown in FIGS. 1–5, the device for measuring, storing, dispensing and recording consumption of a liquid takes the form of an elongated vessel 100 having undulated vertically, annular side wall 102 integral with a bottom wall 104. The side wall at the end opposite the bottom wall has an annular opening surrounded by thread bars for releasably receiving sports cap 106. As is well known, the sports cap includes a dispenser nozzle 108 that can be raised from a lower position to allow a discharge of liquid typically water from a vessel. The sports cap is removed from a threaded or snap-on connection to allow refilling of the vessel. Each time the vessel is appropriately refilled, one of a plurality of tactile buttons 110 is actuated to tally the refilling of the vessel. The buttons are distributed about an annular track spaced above graduated markings 112 used to indicate the quantity of liquid in the vessel according to the liquid level height. The annular side wall of the vessel is preferably made of plastic and of a sufficient thickness to allow the formation of a plurality of spaced apart tactile buttons having the form of protruding domes or hemispheres 122 each of which are formed by concentric opposite groove crease line(s) 120. As shown in FIGS. 1, 3, 4 and 5, each dome is hemispherical but can take the form of a rectangle, square or other jutted configurations. By this construction, the domes are tactility in an actuated depressed position lying inward from the annular outer surface of the side wall and in a reset, restart position protruding outwardly from the annular surface of the side wall. As shown in FIG. 4A, there is a concentric convolution of a wall portion 124B joined by web sections 124C to a central dome 124A. Wall portion 124B is joined by web section 124C to wall 102. Web sections 124C form circular grooves functioning as crease lines. More than one wall portion 124B may be provided and have different arcuate lengths but can comprise the same arcuate length if desired without departing from the spirit of the present invention.

Figure 4B:
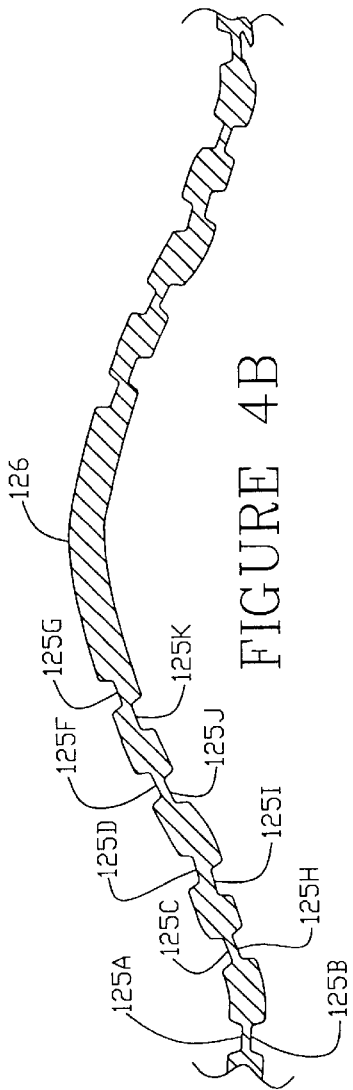
FIGS. 4B, 4C and 4D are sectional views similar to FIG. 4A and illustrating three additional embodiments of a tactile button shown in FIGS. 3 and 4.

The embodiment of a tactile button shown in FIG. 4B includes opposing external and internal circular grooves 125A and 125B, respectively, having the same and maximum diameter in the construction of the tactile button. External circular grooves 125C, 125D, 125F and 125G have diameters that are smaller than the diameters of internal circular grooves 125H, 125I, 125J and 125K, respectively. The wall material between the internal and external grooves undergo repeated compression and tension in the operation of the tactile buttons. The offset relation between 125C–125G with respect to the respective grooves 125H–125K imparts a resilient biasing force to central dome section 126 to stabilize the section in both of the actuated and un-actuated, restart positions.

Figure 4C:
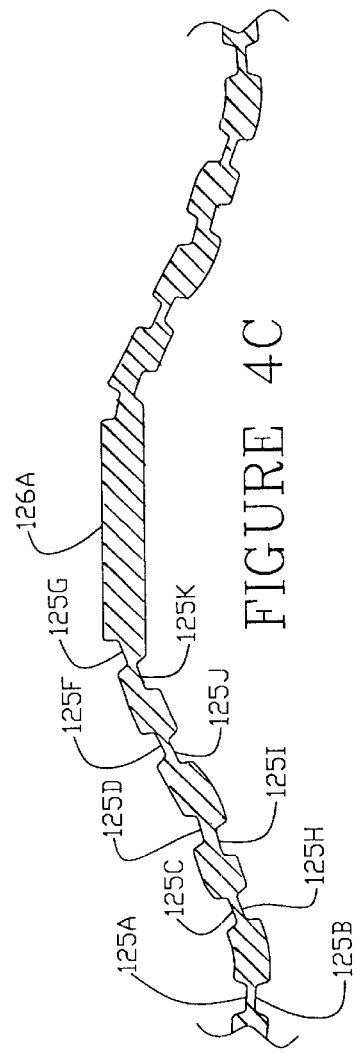

The embodiment of a tactile button shown in FIG. 4C is the same as shown and described in regard to FIG. 4B and includes: external and internal circular grooves 125A and 125B, respectively; external circular grooves 125C, 125D, 125F and 125G; and the same offset relation between 125C–125G with respect to the respective grooves 125H–125K. Unlike the other embodiments of the present invention, the embodiment of FIG. 4C provides a planar central wall section 126A which receives a resilient biasing force to stabilize the planar central wall section 126A in both of the actuated and un-actuated, restart positions.

Figure 4D:
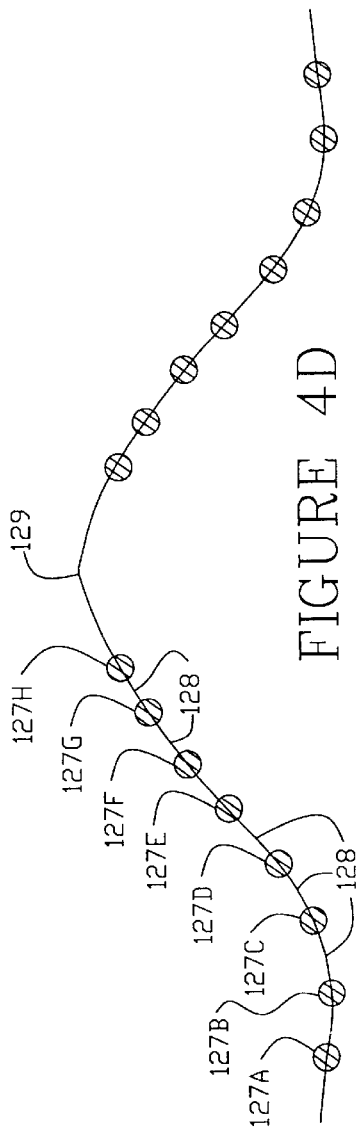

The embodiment of a tactile button shown in FIG. 4D includes concentrically arranged circular beads 127A–127H interconnected by relatively thin circular wall sections 128. By this construction and relationship of parts forming the button there is imparted the desired resiliency and stability to a central dome section 129 in both of the actuated and un-actuated, restart positions. In each embodiment of FIG. 4A, 4B, 4D and 7, the dome wall section 124A, 126, 129 and 146 may take the form of a planar wall section without departing from the spirit of the present invention.

Figure 6:
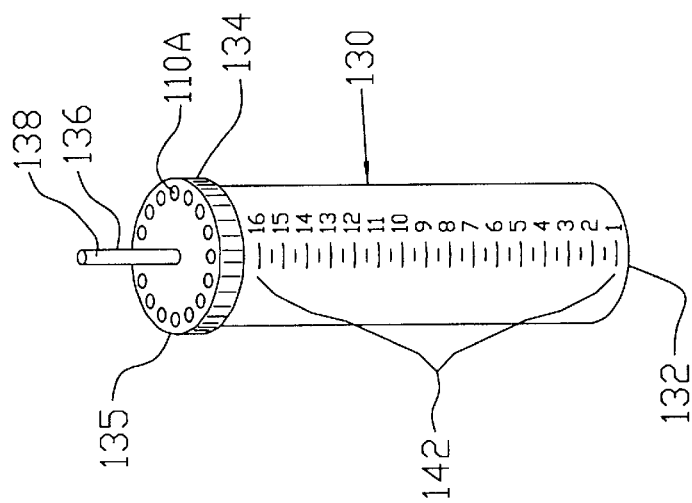
FIG. 6 is a view similar to FIG. 1 illustrating a second embodiment of the present invention.
Figure 5:
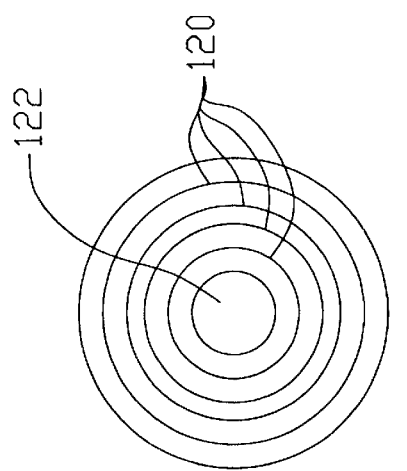
FIG. 5 is a plan view of the tactile button shown in FIG. 4.
Figure 7:
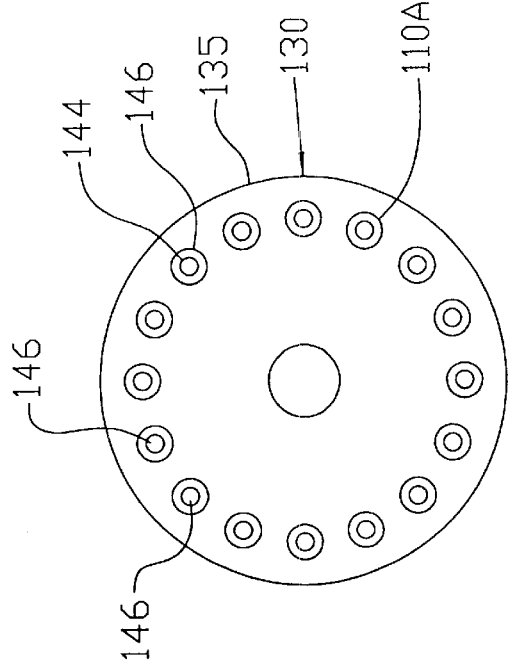
FIG. 7 is a top plan view of the embodiment as shown in FIG. 6.

FIGS. 6 and 7 illustrate a second embodiment of the present invention a cylindrical vessel 130 closed by a bottom wall 132 and having a fill opening surrounded by thread bars for receiving a screw cap or snap-on cap 134 providing with a dispensing straw 136 normally closed by a closure cap 138. The screw or snap-on cap is made of plastic and provided with a plurality of tactile buttons 110A actuated to tally initial filling and refilling of the vessel. The buttons are distributed about an annular track on a planar end wall 135 of the screw or snap-on cap 134. Spaced vertically along the cylindrical side wall of the vessel are graduated markings 142 used to indicate the quantity of liquid in the vessel according to the liquid level height. The planar end wall 135 is made with a sufficient thickness of plastic material to allow the formation of concentric opposite grove crease lines 144 encircling each protruding dome 146. By this construction, the domes are tactility in an actuated depressed position lying inward from the planar end wall 135 of the screw or snap-on cap and in a reset, restart position protruding outwardly from the planar end wall 135 of the screw or snap-on cap.

In the use of the present invention, an example is given for a non-active person having a body weight of 224 pounds. A water intake is calculated to be 112 ounces per day at a rate of ½ ounce per pound of body weight. The suggested total number of intake ounces 112 is then divided by the number of waking hours per day at 16 for a total number of recommended intake ounces at 7 per hour. The user fills the bottle to the 7-ounce graduation on the bottle and then within the first hour consumes the water content in the bottle. This event triggers the actuation of one tactile button. The user then refills the bottle to 7 ounces and then within the second hour consumes the water content in the bottle. This event triggers the actuation of another tactile button. At the end of the day, sixteen tactile buttons are in an actuated state. This invention removes all the guess work and easily enables the user to tally daily water consumption accurately.

Figure 8:
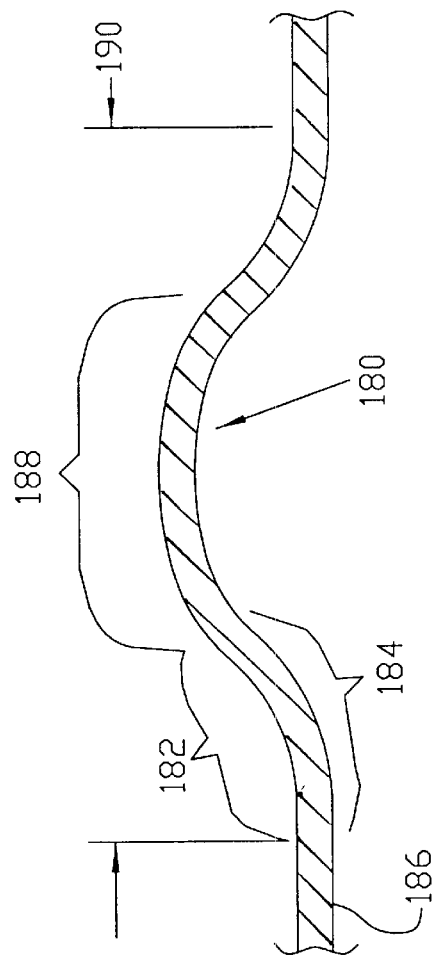
FIG. 8 is a sectional view similar to FIG. 4A and illustrating an enlarged fragmentary view of a tactile button used to tally repeated fillings of liquid in the device according to a still further embodiment of the present invention.

FIG. 8 illustrates a configuration of a tactile button 180 having a characteristic of construction that distinguishes from the construction of tactile buttons described and shown hereinbefore by the provision of smooth outer and inner face surface sections 182 and 184 extending along the transition from the vessel wall 186 of the container to the protruding section 188 of the button. Internal and external circular grooves and all crease lines have been completely eliminated in the embodiment of FIG. 8. The outer surface section 182 combined with protruding section 188 establish the hemispherical configuration for dome 190. While the button 180 is shown in FIG. 8 with a hemispherical configuration, the button may take the form of a rectangle, square or other jutted configurations each, however, notably void of a crease line at the junction with wall 186. The contour of the side wall instead of annular as shown in FIG. 2 can include annular wall sections of diverse radii or annular wall sections interleaved with planar wall sections of various portions.

Figure 9:
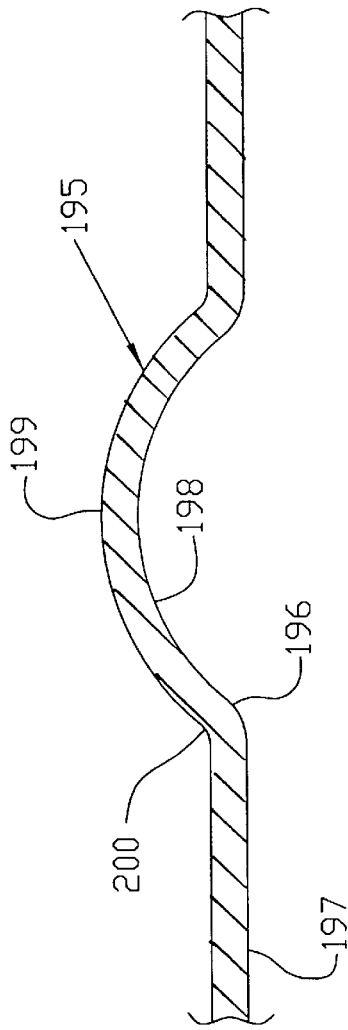
FIG. 9 is a sectional view similar to FIG. 4A and illustrating an enlarged fragmentary view of a tactile button used to tally repeated fillings of liquid in the device according to a further embodiment of the present invention.

FIG. 9 illustrates a configuration of a tactile button 195 embodying a construction characterized by internally rounded sections 196 joining vessel wall 197 with the internal face surface 198 of hemispherical button 199. The external surface configuration between vessel wall 197 and the hemispherical button 199 is notably characterized by a demarcation line 200 where the junction between the external surface of vessel 197 abruptly changes by an angular relation that is not rounded in the area of the transition.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A device for use in measuring, storing, dispensing, and recording consumption of a liquid, said device comprising in combination:

a vessel having boundary walls enclosing a volume for storing a liquid, said boundary walls terminate to form an aperture to supply and discharge liquid to the vessel; and a plurality of tactile buttons supported by said vessel and having bidirectional positions to indicate a tally of repeated filling of liquid in the vessel, said tactile buttons each being defined by a wall section bound within a wall portion defined by a circular groove, the circular grooves of said tactile buttons comprise a plurality of internal circular grooves and a plurality of external circular grooves concentrically arranged with the external circular grooves having diameters different from the diameters of the respective internal circular grooves.

2. The device according to claim 1 wherein each button consists of a generally hemispherical dome.

3. The device according to claim 1 further including a closure engageable with the boundary walls to allow limited access to the volume of said vessel.

4. The device according to claim 1 further including wherein each button includes a generally planar wall section.

5. The device according to claim 1 further including graduated markings indicative of a volume of liquid stored in the vessel and wherein said tactile buttons are dispersed about said vessel at sites discrete from said graduated markings.

6. The device according to claim 1 where said plurality of tactile buttons is formed in said boundary walls of said vessel.

7. The device according to claim 1 further including a cap for enclosing the aperture of said boundary walls of the vessel and wherein said plurality of tactile buttons is formed in said cap.

8. The method according to claim 1 wherein said tactile buttons are defined by wall sections bounded within wall sections separated by circular grooves.

9. The device according to claim 8 wherein said circular grooves comprise a plurality of internal circular grooves and a plurality of external grooves concentrically arranged with the external grooves having diameters different from the diameters of the respective internal groves.

10. The method according to claim 8 wherein said tactile buttons are disbursed about said vessel at sites discrete from said graduated markings.

11. The method according to claim 9 wherein said tactile buttons are dispersed about said vessel at sites discrete from said graduated markings.

12. The method according to claim 9 where said plurality of tactile buttons are formed in a boundary wall of said vessel.

13. The method according to claim 9 wherein said selecting a vessel includes a cap for enclosing the vessel and wherein said plurality of tactile buttons are formed in said cap.

\* \* \* \* \*